(12) United States Patent
Chen et al.

(10) Patent No.: US 6,621,695 B1
(45) Date of Patent: Sep. 16, 2003

(54) COMPUTER ENCLOSURE INCORPORATING DRIVE BRACKET

(75) Inventors: Yun Lung Chen, Taipei (TW); Jung Chi Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 95 days.

(21) Appl. No.: 10/004,462

(22) Filed: Nov. 1, 2001

(51) Int. Cl.[7] .................................................. G06F 1/16
(52) U.S. Cl. ...................... 361/685; 361/679; 248/609; 312/223.2
(58) Field of Search ................. 361/679–727; 248/560, 581, 609–612; 312/223.1, 223.3, 227.2

(56) References Cited

U.S. PATENT DOCUMENTS 6,460,948 B2 * 10/2002 Roesner et al. .......... 312/223.1
6,462,940 B1 * 10/2002 Diaz et al. .................. 361/683
6,473,301 B1 * 10/2002 Levy et al. ................. 361/685

* cited by examiner

Primary Examiner—Darren Schuberg
Assistant Examiner—Hung Van Duong
(74) Attorney, Agent, or Firm—Wei Te Chung

(57) ABSTRACT

A computer enclosure includes a cage (10), a drive bracket (30) fixed in the cage, and a cover (80) attached on the cage. The cage includes a front panel (14) defining locating holes (20), and a side panel (16) defining a plurality of retaining openings (24). The drive bracket includes a pair of shoulders (40) each forming locating tabs (44) thereon for accurately supporting a data storage device (100), and a side wall (36) defining a plurality of retaining cutouts (60). The cover forms locating posts (86) received in the locating holes, and a plurality of hooks (84) engaged with corresponding retaining openings and retaining cutouts. The cover further forms protrusions (90) that depress the storage device toward the shoulders and thereby firmly secure the storage device within the enclosure, and a spring plate (92) contacting the storage device to establish grounding paths between the storage device and the enclosure.

20 Claims, 4 Drawing Sheets

COMPUTER ENCLOSURE INCORPORATING DRIVE BRACKET

BACKGROUND OF THE INVENTION

1. FIELD OF THE INVENTION

The present invention relates to computer enclosures, and particularly to computer enclosures incorporating drive brackets that readily attach data storage devices within the enclosure.

2. RELATED ART

Various data storage devices are installed in computers for communication and handling of data. Such devices include, for example, hard disk drives, floppy disk drives, and CD-ROM drives.

In a conventional system, a data storage device is directly attached to a computer enclosure with bolts. However, attachment with bolts is unduly complicated and time-consuming.

Thus rails have been developed to mount a data storage device to a computer enclosure. A pair of rails is respectively attached to opposite sides of a data storage device with bolts. The assembly is then slidably inserted into the enclosure. However, mounting the rails to the data storage device with bolts is still complicated and time-consuming. Additionally, electrostatic charges are easily built up on a casing of the data storage device during operation. Conventional rails attached to a data storage device for fixing the device inside a computer enclosure are generally made of plastic. The plastic rails do not allow electrostatic discharge from the casing to the enclosure. Additional electrical grounding paths to discharge accumulated electrostatic charges on the data storage device are required. Otherwise, accumulated electrostatic charges can interfere with proper operation of the computer system.

SUMMARY OF THE INVENTION

Accordingly, an object of the present invention is to provide a computer enclosure incorporating a drive bracket readily and firmly attaching a data storage device within the computer enclosure.

Another object of the present invention is to provide a computer enclosure incorporating a drive bracket which provides grounding paths from a data storage device mounted therein to the computer enclosure.

To achieve the above-mentioned objects, a computer enclosure in accordance with the present invention comprises a cage, a drive bracket, and a cover. The cage comprises a front panel defining a pair of locating holes, a side panel defining a plurality of retaining openings, and a rear panel defining a plurality of retaining slits. The drive bracket is fixed in a top portion of the cage, and comprises a pair of shoulders together with a side wall having a plurality of retaining cutouts. Each shoulder forms a pair of locating tabs, for accurately supporting a data storage device on the shoulders. The cover forms a pair of locating posts received in the locating holes, a plurality of hooks engaged with corresponding retaining openings and retaining cutouts, and a pair of locking tabs received in the retaining slits and thereby securing the cover on the top portion of the cage. The cover further forms a plurality of press protrusions that depress the storage device toward the shoulders and thereby firmly secure the storage device within the enclosure, and a spring plate contacting the storage device to establish grounding paths between the storage device and the enclosure.

Other objects, advantages and novel features of the present invention will be drawn from the following detailed description of preferred embodiments of the present invention with attached drawings, in which:

DESCRIPTION OF THE PREFERRED EMBODIMENT

Figure 1:
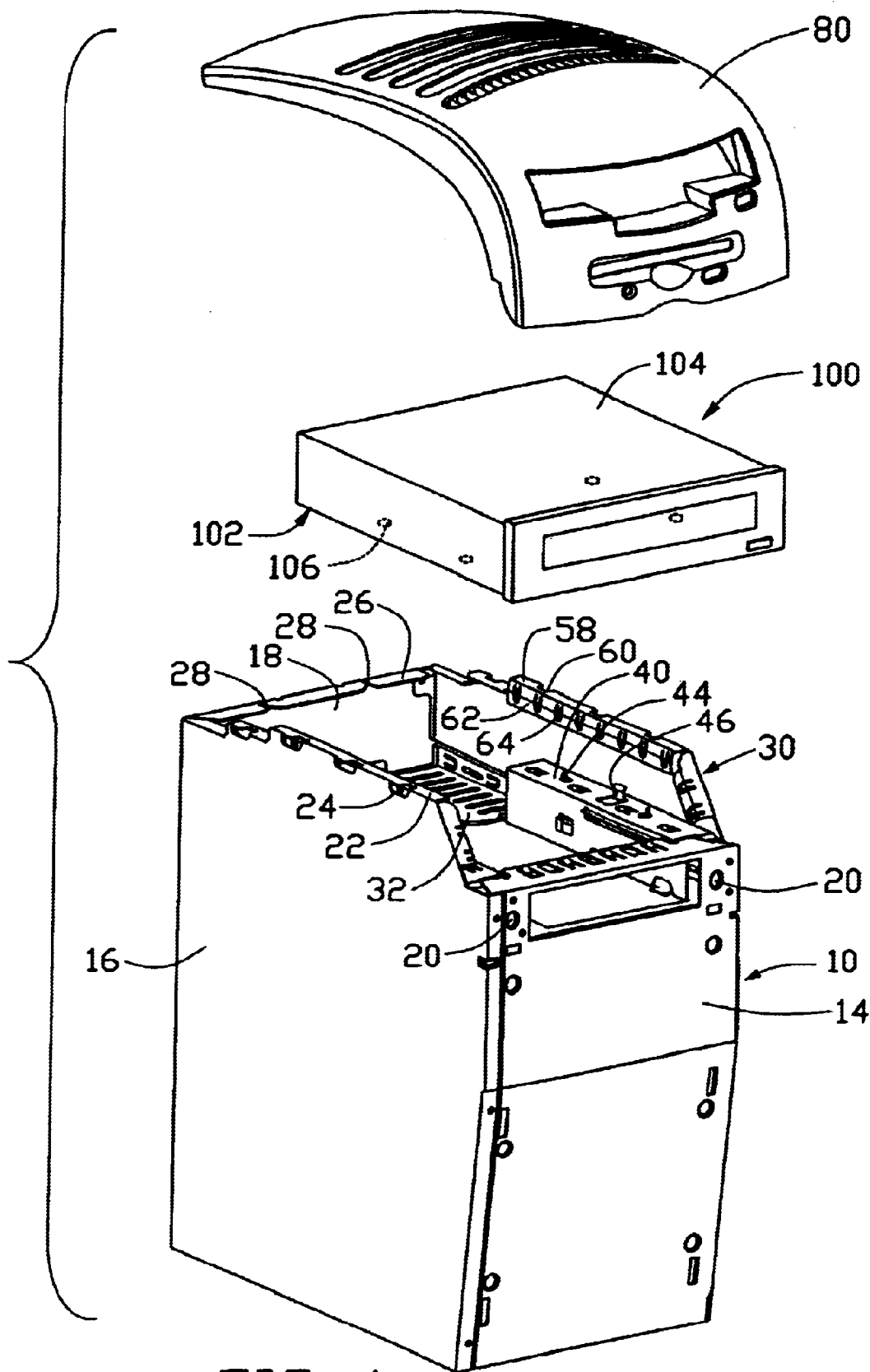
FIG. 1 is an exploded view of a computer enclosure in accordance with the present invention, together with a CD-ROM drive.

Referring to the attached drawings, FIG. 1 shows a computer enclosure in accordance with the present invention, together with a data storage device. The enclosure comprises a cage 10, a drive bracket 30, and a cover 80. For convenience, the data storage device described herein is a CD-ROM drive 100. The CD-ROM drive 100 comprises a bottom plate 102 and a top plate 104. The bottom plate 102 defines four locating apertures 106 adjacent four corners thereof respectively.

The cage 10 comprises a front panel 14, a side panel 16, and a rear panel 18. A pair of locating holes 20 is defined in opposite sides of an upper portion of the front panel 14. A first flange 22 extends horizontally inwardly from a top edge of the side panel 16. A plurality of L-shaped retaining openings 24 is defined at a junction of the first flange 22 and the side panel 16. A second flange 26 extends horizontally inwardly from a top edge of the rear panel 18. A pair of retaining slits 28 is defined in the second flange 26.

Figure 2:
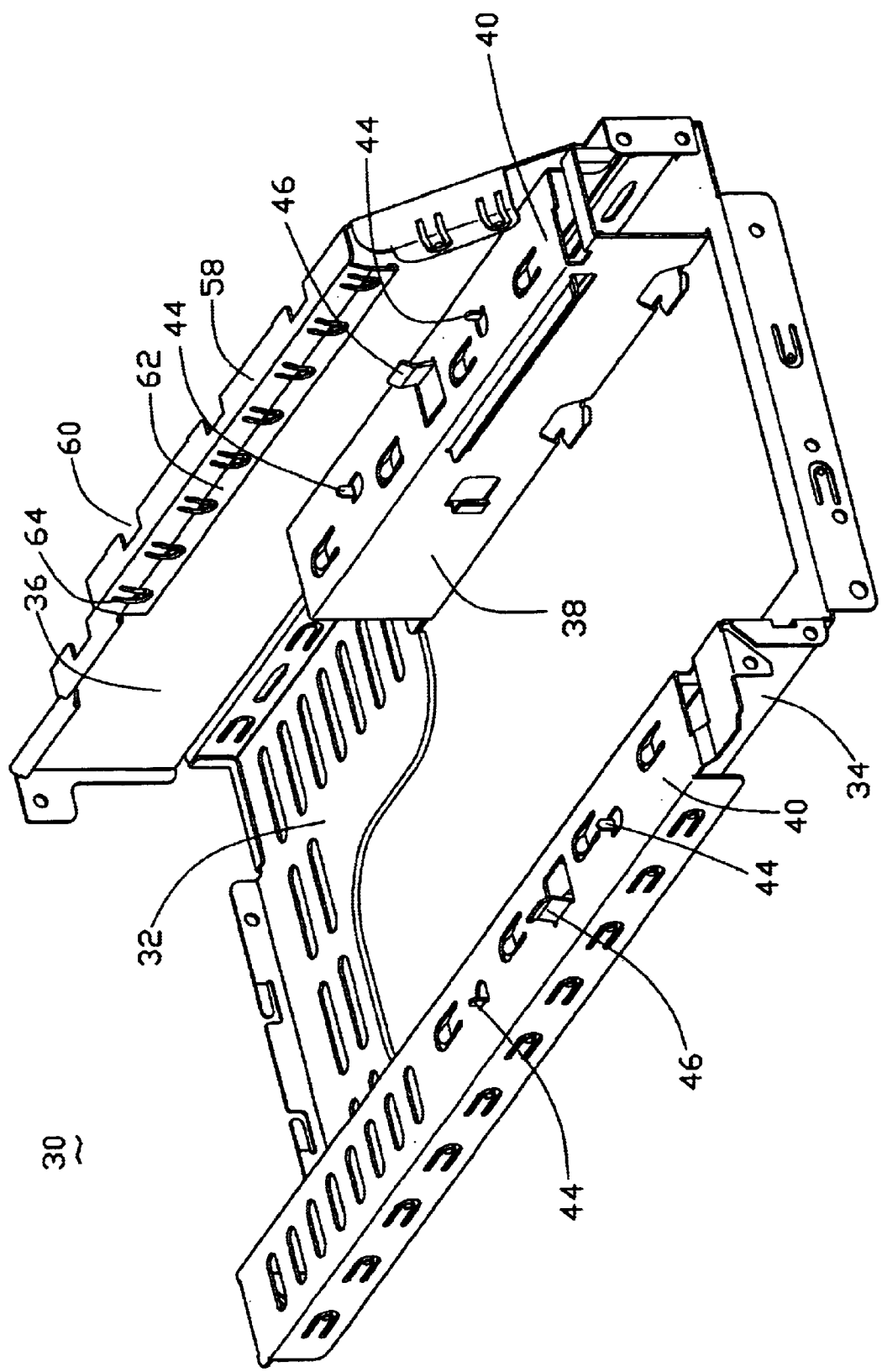
FIG. 2 is a perspective view of a drive bracket of the computer enclosure of FIG. 1.

Referring also to FIG. 2, the drive bracket 30 is for fixing in an upper portion of the cage 10. The drive bracket 30 comprises a bottom wall 32, and first and second side walls 36, 34 respectively extending upwardly from opposite lateral edges of the bottom wall 32. The bottom wall 32 is stamped upwardly in a front-portion thereof adjacent to the first side wall 36, to form a third side wall 38. The first side wall 36 extends higher than both the second and third side walls 34, 38. Upper portions of the second and third side walls 34, 38 are respectively bent horizontally outwardly to form a pair of shoulders 40. The shoulders 40 are coplanar with each other. Each shoulder 40 upwardly forms a pair of locating tabs 44. On each shoulder 40, one of the locating tabs 44 is perpendicular to the other locating tab 44. A guide tab 46 extends upwardly from each shoulder 40, between the locating tabs 44. An upper portion of each guide tab 46 is bent slightly outwardly toward a lateral extremity of the drive bracket 30. A bent portion 58 inwardly extends from a top edge of the first side wall 36. A plurality of retaining cutouts 60 is defined at a junction of the first side wall 36 and the bent portion 58. A bent ledge 62 extends downwardly from a free edge of the bent portion 58. A plurality of spring tabs 64 is formed in the bent ledge 62.

Figure 3:
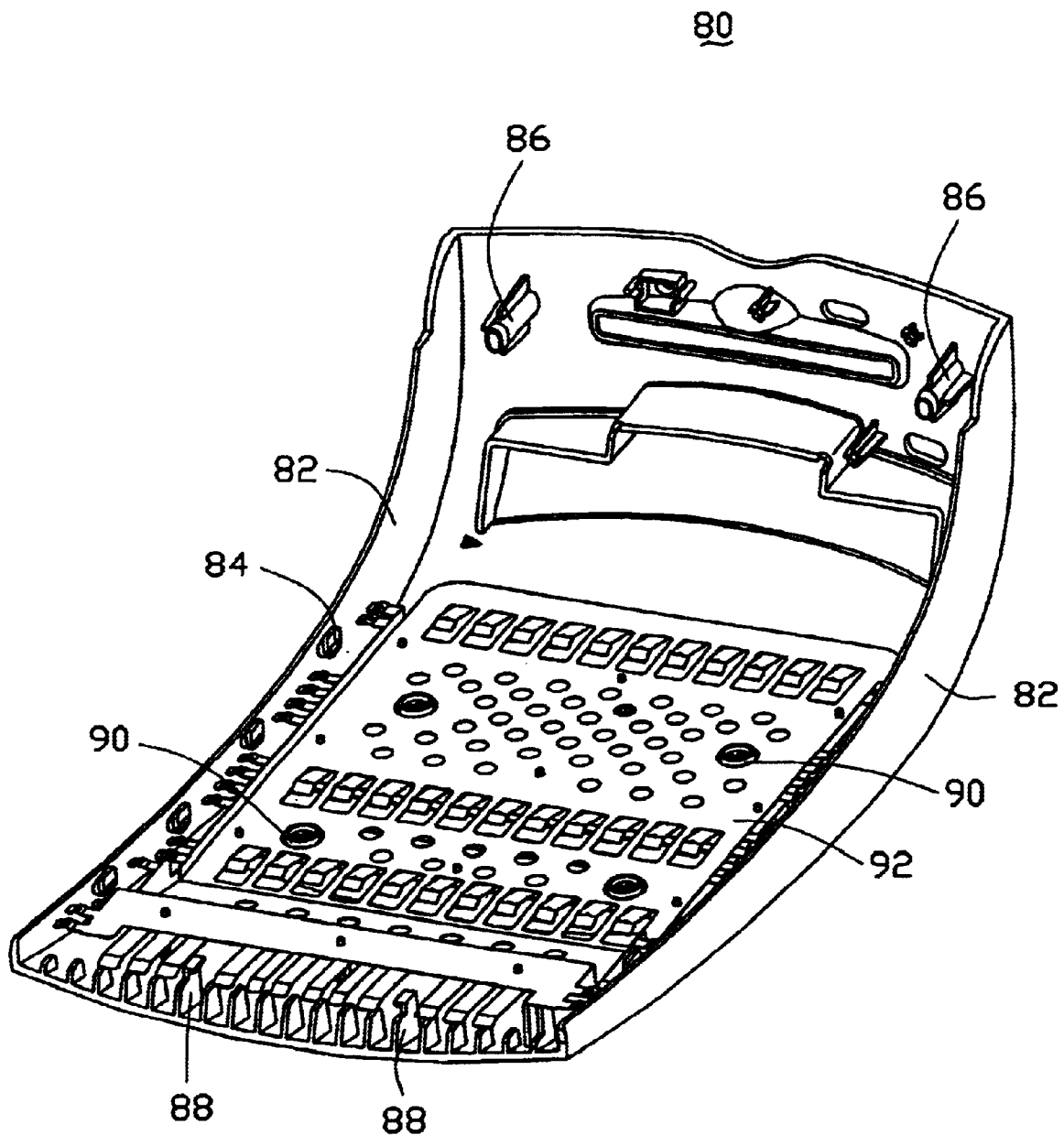
FIG. 3 is a perspective view of a cover of the computer enclosure of FIG. 1, but viewed from another aspect.

Referring to FIG. 3, the cover 80 comprises a pair of side rims 82 formed on opposite longitudinal sides thereof respectively. A plurality of L-shaped hooks 84 is inwardly formed on each side rim 82. The hooks 84 correspond to the retaining openings 24 of the cage 10 and the retaining cutouts 60 of the drive bracket 30. A pair of locating posts 86 inwardly extends from opposite sides respectively of a front portion of the cover 80, corresponding to the locating holes 20 of the front panel 14 of the cage 10. A pair of locking tabs 88 is inwardly formed at a rear edge of the cover 80, corresponding to the retaining slits 28 of the cage 10. A plurality of press protrusions 90 is formed on an inside face of the cover 80, for pressing against the CD-ROM drive 100. A spring plate 92 is attached on the inside face of the cover 80, and the press protrusions 90 extend through corresponding holes (not labeled) defined in the spring plate 92.

Figure 4:
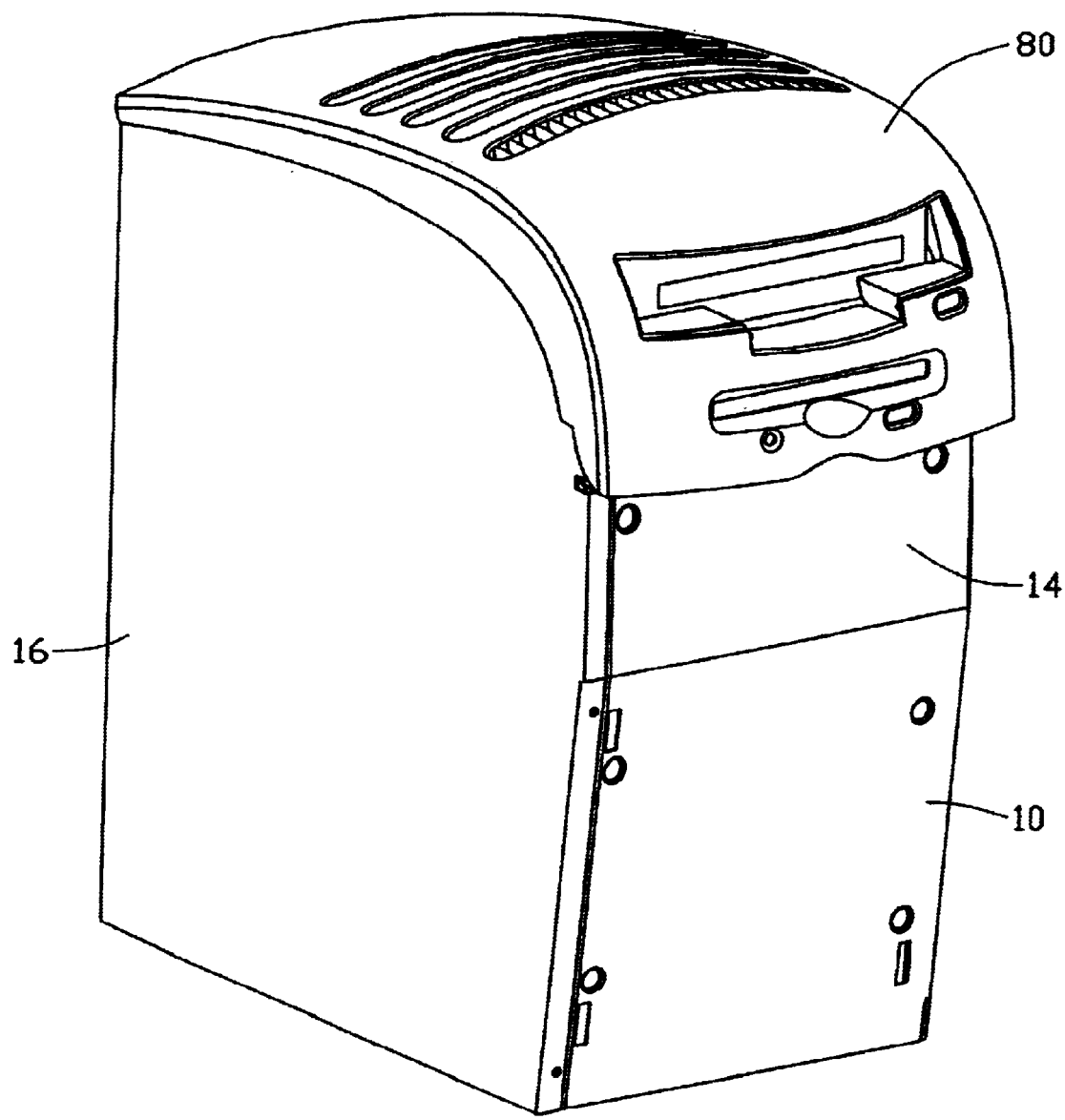
FIG. 4 is an assembled view of FIG. 1.

Referring also to FIG. 4, in assembly, the CD-ROM 100 is placed on the drive bracket 30 from above of the drive bracket 30. The guide tabs 46 of the drive bracket 30 guide the CD-ROM 100 onto the shoulders 40 of the drive bracket 30. The locating tabs 44 of the drive bracket 30 are respectively received in the locating apertures 106 of the CD-ROM drive 100, thereby preventing the drive bracket 30 from sliding on the shoulders 40. The cover 80 is then attached to the cage 10. The locating posts 86 of the cover 80 are received in the locating holes 20 of the cage 10. The hooks 84 of the cover 80 are engaged in the retaining openings 24 of the cage 10 and the retaining cutouts 60 of the drive bracket 30. The press protrusions 90 abut against the top plate 104 of the CD-ROM drive 100, thereby depressing the drive bracket 30 toward the shoulders 40. The LCD-ROM drive 100 is thus firmly secured within the cage 10. The spring plate 92 contacts the top plate 104 of the CD-ROM drive 100, thereby establishing grounding paths between the CD-ROM drive 100 and the enclosure. The spring tabs 64 of the drive bracket 30 abut against a side of the CD-ROM drive 100, thereby establishing grounding paths between the CD-ROM drive 100 and the enclosure.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
 a cage having a side panel, the side panel defining a retaining opening;
 a drive bracket fixed in an upper portion of the cage, the drive bracket comprising a pair of coplanar shoulders for supporting a storage device thereon, and a first side wall defining a retaining cutout, the first side wall being higher than the shoulders; and
 a cover attached on the upper portion of the cage and adapted for depressing the storage device toward the shoulders, the cover forming a pair of hooks respectively engaged with the retaining opening and the retaining cutout, thereby securing the storage device within the enclosure.

2. The computer enclosure as claimed in claim 1, wherein the drive bracket further comprises a second side wall and a third side wall disposed between the first and second side walls, and wherein the shoulders are respectively formed by outwardly bending the second and third side walls.

3. The computer enclosure as claimed in claim 1, wherein the cage further comprises a front panel defining a locating hole, and the cover forms a locating post received in the locating hole for facilitating accurate attachment of the cover to the cage.

4. The computer enclosure as claimed in claim 1, wherein the cage further comprises a rear panel defining a retaining slit, and the cover forms a locking tab engaging in the retaining slit.

5. The computer enclosure as claimed in claim 1, wherein the cover comprises a plurality of protrusions formed on an inside face thereof, for abutting against the storage device.

6. The computer enclosure as claimed in claim 1, wherein the first side wall of the drive bracket forms a plurality of spring tabs thereon, for abutting against the storage device and establishing grounding paths between the storage device and the enclosure.

7. The computer enclosure as claimed in claim 2, wherein each shoulder forms a locating tab thereon for being received in the storage device to thereby locate the storage device on the drive bracket.

8. The computer enclosure as claimed in claim 7, wherein each shoulder forms a pair of locating tabs that are perpendicular to each other.

9. The computer enclosure as claimed in claim 7, wherein a guide tab extends from each shoulder for guiding the storage device onto the bracket.

10. The computer enclosure as claimed in claim 5, wherein a spring plate is attached on the inside face of the cover, for contacting the storage device and establishing grounding paths between the storage device and the enclosure, and wherein the protrusions of the cover extend through corresponding holes defined in the spring plate.

11. A method for attaching a storage device to a computer enclosure, the computer enclosure comprising a cage, a cover and a drive bracket, the method comprising the following steps:
 a) fixing the drive bracket in a top portion of the cage;
 b) placing the storage device onto the drive bracket from above of the drive bracket;
 c) attaching the cover to the top portion of the cage to sandwich the storage device against the drive bracket and thereby secure the storage device within the enclosure.

12. The method as claimed in claim 11, wherein the drive bracket comprises a pair of coplanar shoulders for supporting the storage device thereon.

13. The method as claimed in claim 11, wherein the cage comprises a side panel defining a retaining opening, the drive bracket further comprises a side wall defining a retaining cutout, and the cover forms a pair of hooks respectively engaging in the retaining opening and the retaining cutout.

14. The method as claimed in claim 11, wherein the cover further has a plurality of press protrusions for abutting against the storage device.

15. The method as claimed in claim 12, wherein each shoulder forms at least one locating tab for positioning the storage device on the shoulders.

16. The method as claimed in claim 13, wherein the cage further comprises a front panel defining at least one locating hole, and the cover has at least one locating post received in the at least one locating hole for facilitating accurate attachment of the cover to the cage.

17. The method as claimed in claim 14, wherein a spring plate is attached on an inside face of the cover for contacting the storage device and establishing grounding paths between the storage device and the enclosure, and the protrusions of the cover extend through corresponding holes defined in the spring plate.

18. The method as claimed in claim 15, wherein a guide tab extends from each shoulder for guiding the storage device onto the bracket.

19. The method as claimed in claim 17, wherein the cage further comprises a rear panel defining at least one retaining slit, and the cover forms at least one locking tab engaging in the at least one retaining slit.

20. A computer comprising:

an enclosure comprising a cage;

a drive bracket fixed to the cage, the drive bracket comprising a pair of coplanar shoulders;

a data storage device having a bottom plate seated on the shoulders;

stopping means formed on the shoulders for preventing the storage device from sliding on the shoulders; and a cover fixed to the cage and covering the storage device, said cover comprising a spring plate electrically engaging with the storage device, and pressing means for depressing the storage device toward the shoulders and thereby securing the storage device in position.

* * * * *